United States Patent [19]

Hill

[11] Patent Number: 4,978,690

[45] Date of Patent: Dec. 18, 1990

[54] METHOD OF MAKING POROUS INORGANIC PARTICLE FILLED POLYIMIDE FOAM INSULATION PRODUCTS

[75] Inventor: Francis U. Hill, San Diego, Calif.

[73] Assignee: Sorrento Engineering, Inc., National City, Calif.

[21] Appl. No.: 367,625

[22] Filed: Jul. 12, 1989

Related U.S. Application Data

[62] Division of Ser. No. 312,490, Feb. 21, 1989, Pat. No. 4,865,784.

[51] Int. Cl.$^5$ .............................. C08J 9/40; C08J 9/32
[52] U.S. Cl. ......................................... 521/54; 521/91; 521/184; 521/185; 521/189; 523/218; 523/219
[58] Field of Search .................... 521/54, 91, 184, 185, 521/189; 523/218, 219

[56] References Cited

U.S. PATENT DOCUMENTS 4,865,784  9/1989  Hill ........................................ 521/54

Primary Examiner—Morton Foelak
Attorney, Agent, or Firm—Frank D. Gilliam

[57] ABSTRACT

A method of making thermal insulating products comprising porous, lightweight, high temperature resistant inorganic particles in a polyimide foam matrix and the product thereof. A polyimide precursor powdered is mixed with about equal weight of flake-like porous inorganic particles to substantially uniformly coat the particles with powder. The mixture is placed in a mold and compressed slightly. The assembly is heated to the foaming temperature of the polyimide precursor for a period suitable to produce uniform foaming. Then the temperature is raised to the curing and crosslinking temperature of the precursor for a time period sufficient to produce complete cure. A high temperature and flame resistant, light weight, highly insulating product results. If desired, protective sheets of material may be bonded to selected product surfaces during or after the molding operation.

4 Claims, 1 Drawing Sheet

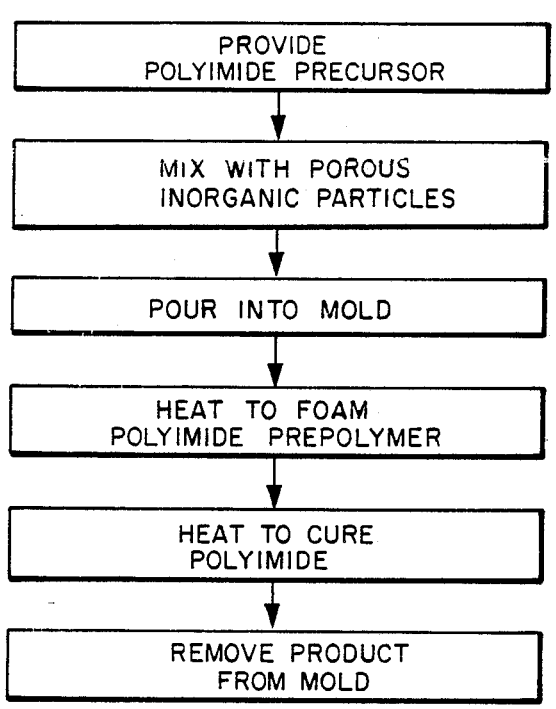
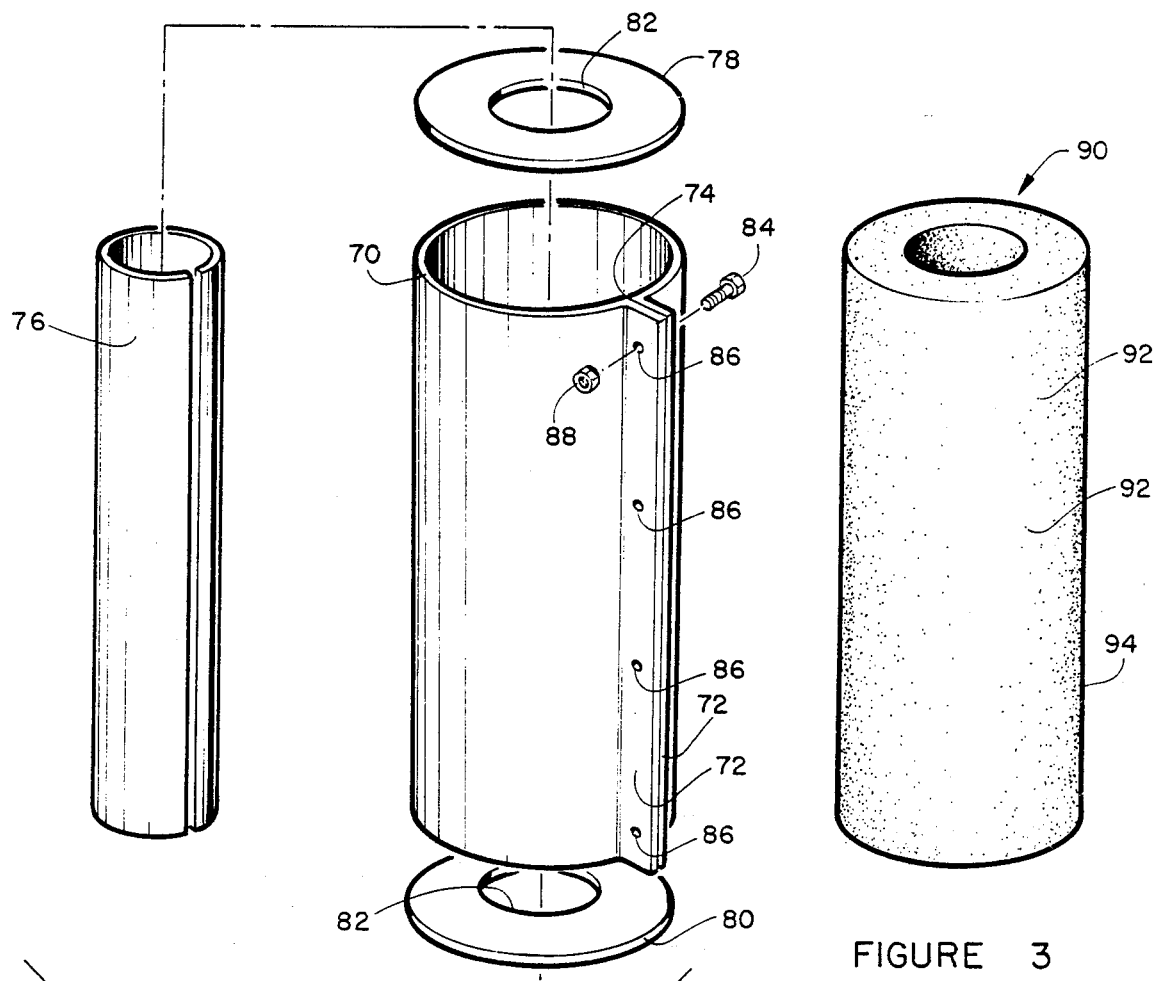
FIGURE 1
FIGURE 2
FIGURE 3

METHOD OF MAKING POROUS INORGANIC PARTICLE FILLED POLYIMIDE FOAM INSULATION PRODUCTS

This is a divisional of co-pending application Ser. No. 07/312,490 filed on Feb. 21, 1989 U.S. Pat. No. 4,865,784.

BACKGROUND OF THE INVENTION

This invention relates in general to thermal insulating products and, more specifically, to high temperature flame resistant thermal insulation using a combination of polyimide foam and porous, lightweight inorganic particles in insulating products.

Lightweight, porous inorganic materials such as pumice, expanded vermiculite and "popped" perlite have long been used in thermal insulation, lightweight concrete, as packing material, etc. Pumice is a highly porous igneous rock, primarily an aluminum silicate. Perlite is a form of glassy rock, similar to obsidian, which when heated to its softening temperature rapidly expands or pops to form a fluffy lightweight material similar to pumice. Vermiculite is a mineral of the mica group, a hydrated magnesium-aluminum-silicte, having the ability to expand 6 to 20 times in volume when heated above 1400° F. When used as thermal insulation, these materials are ordinarily used as loose particles to fill hollow walls or the like, or are incorporated in inorganic binders such as concrete. This insulation is inexpensive an fairly effective, but is not well adapted to complex light weight insulation shapes, such as pipe insulation;. Further, the inorganic binders have poor insulating qualities and are heavy.

Organic binders, such as epoxies, have been used in some case to reduce the weight and improve the formability of porous inorganic particle based insulating materials;. However, these organic binders tend to limit the temperatures at which the insulating materials can be used to less than 300° F. due to binder degradation. Also, the insulating qualities of the binder itself tends to be low.

In low temperature applications, with complex insulation shapes, foamed organic resin insulation has been widely used. Typical of these are expanded cellular polystyrene as described by Charpentier in U. S. Pat. No 3,863,908, polyurethane foams as described by Willy in U.S. Pat. No. 3,998,884 and phenolics as descried by Bruning et al in U.S. Pat. No. 3,883,010. While these materials often have excellent insulating characteristics and are inexpensive to manufacture, they often have low strength and low impact resistance and cannot be used at temperatures above 300° F. These organic materials degrade at higher temperatures, may burn, and often emit toxic gases at high temperatures or when exposed to a direct flame.

Recently, a number of polyimide foam insulating materials have been developed, such as those described by Long et al in U.S. Pat. No. 4,621,015 and Gagliani et al in U.S. Pat. Nos. 4,506,038 and 4,426,463. These polyimide materials have much greater resistance to high temperatures, resist burning and degradation when exposed to direct flames and do not emit toxic gases at high temperatures.

Additives, such as fibers, talc and microballoons may be added to the foam material, primarily to improve strength. Such polyimide materials, however, tend to be expensive, require high temperatures for foaming and curing and tend to have lower melting points than vermiculite which melts at a temperature in excess of 2000° F.

Thus, there is a continuing need for improved thermal insulating materials which combine ease of forming and high temperature resistance with low material and manufacturing costs.

SUMMARY OF THE INVENTION

The above-noted problems, and others, are overcome by the method and product of this invention in which particles of porous, lightweight, high temperature resistant, inorganic particles are mixed with a polyimide precursor powder until the particles are coated with the powder, the mixture is placed in a mold, slightly compressed, heated to the foaming temperature of the precursor for a suitable period, then heated to a suitable higher temperature at which the foam cures and crosslinks.

The resulting insulation product, which may typically be in the form of a tube or half-tubes adapted to surround pipes, is strong and well bonded, highly insulating due to the fact that both particles and binder are porous, resistant to high temperature and direct flame and low in material and forming costs.

If desired, surface sheets or layers may be bonded to any surface of the insulating product for increased impact resistance, lower emanations or the like. Typically, such a surface sheet may be bonded to the interior or exterior surface of a tubular pipe insulation sleeve. Any suitable sheet material may be used. Typical sheet materials include thin metal foil such as 2 mil thick stainless steel, aluminum or other metal, a fabric or matt sheet such as glass fiber cloth or the like. The sheet may be bonded with a suitable adhesive after molding of the product. Preferably, a polyimide adhesive is used to maintain the high temperature resistance of the assembly. Alternately, the sheet may be placed in the mold prior to introduction of the powder-particle mixture, to be bonded simultaneously with the molding operation.

BRIEF DESCRIPTION OF THE DRAWING

Details of the invention, and of one preferred embodiment thereof, will be further understood upon reference to the drawing, wherein:

FIG. 1 is a schematic flow diagram of the basic method of this invention;

FIG. 2 is a schematic exploded perspective view of a tubular insulation product made by the method of this invention.

FIG. 3 is a perspective view of a tubular insulation product made by the method of this invention.

DETAILS OF PREFERRED EMBODIMENTS

Referring now to FIG. 1, there is seen a flow diagram of the basic steps in the method of this invention.

As indicated in block 10, a suitable polyimide precursor is selected. Any suitable foamable polyimide precursor which can be caused to foam by heating to a first elevated temperature for a suitable period, and then fully polymerized and crosslinked by heating to a second, higher, temperature for a suitable period may be used. Typical foamable polyimide precursors are described by Gagliani et al in U.S. Pat. Nos. 4,506,038, 4,394,464 and 4,426,463 by Shulman et al in U.S. Pat. No. 4,647,597 Long et al in U.S. Pat. No. 4,518,717. We prefer a polyimide precurser powder material available from the Monsanto Corporation under the Skybond RI 7271 trademark because it gives a strong product and is composed of relatively benign constituents.

The polyimide precursor should be dry and non-tacky and may have any suitable particle size. For best results, it is preferred that the particles have average diameters in the 1/16 to ¼ inch range.

The polyimide precursor powder next is mixed with a suitable quantity of porous, lightweight, high temperature resistant inorganic particles as indicated, in block 20. Any suitable particle material may be used. Typical such particles include pumice, expanded vermiculite, expanded perlite and mixtures thereof. Vermiculite is preferred because of its low weight, and excellent insulating quality.

While the particles may have any suitable size and shape, we prefer flake-like particles having a greatest dimension of from about ¼ to ⅜ inch and a least dimension of from about 1/32 to 1/16 inch because the larger flakes have a lower surface-to-volume ratio, allowing less polyimide to be used in coating the flakes. Vermiculite flakes within those size ranges are available from W. R. Grace Co, Construction Products Division, Cambridge, Mass. as product grade 1 or 2. For best results, all small particles and dust should be sifted out prior to use of the particles in this method.

Before mixing with the polyimide precursor, the inorganic particles are preferably carefully dried (typically at a temperature of about 125° to 300° F. for a suitable period) to eliminate sticking or lumping of the mixture as the polyimide precursor and inorganic particles are mixed.

The particles and precursor may be mixed using any suitable mixing equipment. I have found that excellent mixing and uniform coating of the inorganic particles with the precursor powder can be achieved by tumbling them together in a conventional drum tumbler at about 5 to 50 rpm for about 10 to 15 minutes.

The mixture is then poured into a suitable mold, as indicated by block 30. A preferred mold arrangement is shown in FIGS. 2 and 3. Of course, the mold configuration may be changed to produce insulating products of widely varying shapes.

The mold is coated with any suitable mold release material. Typically, a spray coating may be used or the mold may have a surface layer of permanent mold release material such as the fluorocarbon materials available under the Teflon trademark from the E.I duPont de Nemours & Co.

Once the mold is filled it is preferably tamped or vibrated slightly to assure uniform filling and settling or the material. When the mold is closed it is preferred that the contents be slightly compressed, typically about 2-5 vol% to assure intimate, tight contact between the particles. As is discussed in conjunction with the description of FIGS. 2 and 3, below, the mold can be made to provide this compression as it is closed.

The mixture is then heated to foam the polyimide precursor, as indicated in block 40. The precise optimum temperature and time will depend upon the specific polyimide precursor selected. The temperature should be sufficiently high to assure rapid and complete foaming, but not so high as to significantly polymerize the precursor. Typically, temperatures of from about 275° F. to 400° F. for periods of about 10 to 40 minutes give good results. The foamed precursor fills all of the interstices among the inorganic particles, bonding them into a unitary mass while providing added insulation values from the small, closed, cell nature of the foam.

Next, the temperature is increased to the curing and crosslinking temperature of the polyimide precursor, as indicated in block 50. While the optimum temperature and time will depend upon the precursor selected, generally curing at from about 400° to 650° F. or from about 1 hour or more is effective.

Finally, the well-bonded, unitary insulation product is removed from the mold as indicated in block 60. As mentioned above and described further in some of the following examples, surface sheets or layers may be applied to the product after removal from the mold, if desired. Also, such sheets can be placed against one or more interior walls of the mold prior to introduction of the mixture thereinto, so as to bond to the product as the foam is expanded in the step of block 40.

FIG. 2 presents a schematic exploded perspective view of one preferred mold assembly suitable for use in this method.

The mold consists of split outer sleeve 70 having a pair of outwardly extending flanges 72 adjacent to the split 74. A core 76 which may be a rolled metal sheet or seamless tubing is adapted to be centered within sleeve 70. Upper and lower disks, 78 and 80, respectively, fit within sleeve 70 and have openings 82 for receiving core 76. Bolts 84 (only one shown, for clarity) fit through holes 86 in flanges 72 to draw them together as nuts 88 are tightened on bolts 84. The mold may be made from any suitable material, such as sheet metal, ceramics, plastics, fiber reinforced plastics or combinations thereof. All interior surfaces are coated with a mold release agent. Of course, the mold may have a variety of configurations, depending upon the shape of the insulation product to be produced. For example, more than one set of flanges 72 may be provided, spaced around the tube. Multiple flange sets would assist in uniformly compressing the molding material and would be convenient for very large tubes. Also, the mold could have other shapes, such as half-tubes.

In use, lower disk 80 is placed just within sleeve 70 on a flat surface, core 76 is placed within sleeve 70 with the lower end snugly fitting in opening 82 in disk 80. The mixture of polyimide precursor and inorganic particles is poured into sleeve 70 to the desired level. For best results, the assembly is vibrated slightly or the surface of the material is tamped lightly to assure proper settling and filling of the mold. Upper disk 78 is inserted in sleeve 70 with hold 82 surrounding core 76 and pressed lightly against the surface of the filling material.

Bolts and nuts 84, 88 are tightened, bringing flanges 72 tightly together. Those flanges may be slightly spaced, so that this tightening provides a slight compression of the mixture in the mold. Also, tightening of such slightly spaced flanges will assure tight contact between sleeve 70 and disks 78 and 80. However, precise sealing of the flanges and the interfaces between disks 78 and 80 against sleeve 70 and core 76 is not absolutely necessary. Any slight amount of flash extruded into these interfaces during filling, foaming and curing of the polyimide can be easily trimmed off after processing. The filled assembly is then placed in a suitable oven and heated to foam, then cure, the polyimide precursor, as detailed above.

Upon completion of cure, bolts 84 are released and the foamed product 90 as seen in FIG. 3 is removed. Any flash along product edges is trimmed away. The product is strong, unitary and has excellent insulation and high temperature resistance properties. The product consists of inorganic particles 92 bonded securely by closed cell polyimide foam 94. One advantage of the process is that no shrinkage of the finished part has been noticed. The inner core 76 is easily removable from the finished part, and the finished part exactly fits the mold with no noticeable shrinkage. This is a great advantage in making precision parts of this material. Tooling design is greatly simplified.

There is an advantage in adding the polyimide powder to warm vermiculite, which is from 100° F. in temperature. The powder adheres much more easily to the surface of the vermiculite flakes.

Details of several preferred embodiments of the method of this invention are provided in the following examples. All parts and percentages are by weight, unless otherwise indicated.

EXAMPLE I

A quantity of Grade 2 vermiculate flakes from the W. R. Grace Company is sifted to remove fines and powder, then 400 grams is placed in a tumbling drum. The flakes are about the size of dried Navy beans, with a length of about ⅛ inch an a thickness of about 1/16 inch. About 400 grams of dry, finely powdered polyimide precursor, available from the Monsanto Corporation under the Skybond R17271 trademark, is added to the drum. The drum, which has an internal diameter of about 16 inches with six spaced internal 2 inch ribs, is rotated for about 30 minutes at about 15 rpm, to assure uniform dusting of the vermiculite flakes with the polyimide precursor powder. A sheet metal mold of the sort shown in FIG. 2 is prepared using stainless steal with a coating of Teflon fluorocarbon on the inside. The mold has a length of about 16 inches, an outside diameter of bout 5 ⅜ inches and a core diameter of bout 2 ⅞ inches. The vermiculite/polyimide precursor mixture is poured into the mold and vibrated for a few minutes to assure uniform filling and settling of the flakes. The upper disk is emplaced and pressed down lightly. The mold is compressed about 4 vol% as the flange bolts are tightened. The mold assembly is placed in a preheated 375° F. oven for about 30 minutes during which time the polyimide precursor foams but does not significantly cure. The temperature is then increased to about 500° F. for about 120 minutes, during which time the polyimide foam cures. The mold is cooled to about room temperature and the product is removed. Little, if any, shrinkage from the mold dimensions has occurred. The apparent density of the product is about 9 pounds per cubic foot.

EXAMPLE II

The tubular composite product produced in Example I is placed on a chemical stand above a Bunsen burner. A thermocouple is placed on the underside of the product, adjacent to the burner. The burner is turned on and adjusted to maintain the underside of the product at about 1800° F. for about 30 minutes. No visible smoke issuing from the product is observed. Examination of the product after removal from the flame shows that surface scorching occurs only to a depth of about ½ inch. The flakes of vermiculate remain in place and have not dropped off even where scorching is most extreme. The product is thus seen to have the ability to maintain structural integrity and insulation ability despite exposure to high temperatures and flame for extended periods.

EXAMPLE III

A tubular product is prepared as described in Example I. The outside of the product is coated with a light coating of about 50 grams of the Skybond R17271 precursor dissolved in about 100 ml ethyl alcohol. The coated surface after drying is then wrapped with Vertex 7781 treated glass cloth from AMATEX Corporation, Norristown, Pa. This assembly is returned to the mold assembly and put through the same oven heating cycle as detailed in Example I. Upon removal from the mold, the cloth is found to adhere very tightly to the outside of the insulation. The cloth facing protects against impact damage and serves as an added flame shield during fires.

EXAMPLE IV

The method of Example I is repeated, with the following changes. Prior to filling the mold with the mixture, a sheet of Vertex 7781 cloth is coated on one side with the precursor/alcohol solution described in Example III. The cloth after drying is placed against the interior surface of the outer sleeve, having sufficient tack to remain in place. The mold is filled and processing is continued as described in Example I. The product is found to have the surface sheet well bonded to the outer surface of the tubular insulation product.

EXAMPLE V

A tubular insulation product is prepared as described in Example I. The inside of the tube is coated with the precursor/alcohol solution described in Example II. A sheet of 2 mil thick type 321 bright reflective stainless steel foil is rolled up into a cylinder which fits within the inside of the tube. The tube is reinstalled in the mold, with the core holding the foil in place. The assembly is placed in an oven heated to about 550° F. for about 100 minutes. Upon removal, the foil is found to be tightly adhered to the inside of the insulation tube. The bright reflective foil provides protection of the internal surface during installation on pipes to be protected, and acts as a radiation shield, thereby improving the overall insulating effectiveness. Alternatively an air gap is provided between the insulation and the tube or pipe to be protected. Air gaps of from ⅛ to ¼-inches give considerable added protection during fires.

EXAMPLE VI

The process of Example I is repeated, except that a single layer sleeve of aluminum foil is wrapped around the core prior to installation in the mold assembly. The mold is filled and processed as described in Example I. Upon removal from the mold, the aluminum foil is found to be securely and uniformly bonded to the inside of the insulation tube.

EXAMPLE VII

About 500 grams of expanded perlite having a greatest average dimension of about ¼ inch and least average dimension of about 1/16 inch is sifted to remove all dust and fines, then is heated at about 200° F. for about 40 minutes to remove all moisture. The perlite while still warm is then placed in a tumbling drum with about 400 grams of a dry, finely powdered polyimide precursor prepared as described by Gagliani et al in U.S. Pat. No. 4,394,464 and ground to a fine powder. The tumbler is operated for about 40 minutes to assure complete dusting of powder over the perlite. A mold having the general configuration of that shown in FIG. 2 is prepared. Length is about 10 inches, diameter is about 6 inches and the core diameter is about 4 inches. The mixture is poured into the mold to the desired level and the surface is tamped lightly t assure uniform filling. The upper disk is emplaced and the flanges are tightened. The mold assembly is placed in a pre-heated oven at about 350° F. for about 2 hours, then at about 550° F. for about 2 hours. After cooling to room temperature, the mold assembly is opened. A well bonded unitary tubular insulation product results. No shrinkage of the part from the tooling can be observed.

While certain specific conditions, components and proportions have been specified in the above description of preferred embodiments, these can be varied, where suitable, with similar results. For example, other materials could be added to the polyimide precursor such as colorants or infra-red absorbers and additional sheets or structures could be bonded to the completed insulation product.

Other ramifications, applications and modifications of this invention will occur to those skilled in the art upon reading this disclosure. Those are intended to be included within the scope of this invention as defined in the appended claims.

I claim:

1. A thermal insulation product comprising:
   a cured substantially closed cell polyimide foam matrix;
   substantially uniformly dispersed in said matrix from about 38 to 65 wt%, based on foam weight, of porous, lightweight, high temperature resistant inorganic particles;
   said inorganic particles having flake-like configurations with average greatest dimension in the range of from about ¼ to ⅜ inch and least dimension in the range of from about 1/32 to 1/16 inch.

2. The thermal insulation product according to claim 1, wherein sid inorganic particles are selected from the group consisting of expanded vermiculite, expanded perlite, pumice and mixtures thereof.

3. The thermal insulation product according to claim 1, wherein said inorganic particles are vermiculite flakes having a length of about ⅜ inch and a thickness of about 1/16 inch.

4. The thermal insulation product according to claim 1, wherein said product is tubular in shape.

* * * * *